(12) United States Patent
Mossakowski

(10) Patent No.: US 7,583,843 B2
(45) Date of Patent: Sep. 1, 2009

(54) METHOD FOR THE TRANSMISSION OF ADDITIONAL INFORMATION WHEN USING A METHOD FOR COMPRESSING DATA BY MEANS OF PRIORITIZING PIXEL TRANSMISSION

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 372 days.

(21) Appl. No.: 10/520,246

(22) PCT Filed: Jul. 7, 2003

(86) PCT No.: PCT/DE03/02257

§ 371 (c)(1),
(2), (4) Date: Aug. 31, 2005

(87) PCT Pub. No.: WO2004/006583

PCT Pub. Date: Jan. 15, 2004

(65) Prior Publication Data

US 2006/0126947 A1   Jun. 15, 2006

(30) Foreign Application Priority Data

Jul. 8, 2002   (DE) ................................. 102 30 812

(51) Int. Cl.
  *G06K 9/36*  (2006.01)
  *H04B 1/66*  (2006.01)
  *H04N 7/12*  (2006.01)
(52) U.S. Cl. ........................ 382/232; 382/256; 375/240; 348/384.1

(58) Field of Classification Search ......... 382/232–253, 382/256–257; 375/240–240.29; 348/384.1–440.1
See application file for complete search history.

(56) References Cited

U.S. PATENT DOCUMENTS 4,890,249 A * 12/1989 Yen .............................. 703/13

(Continued)

FOREIGN PATENT DOCUMENTS

DE   692 26 825 T2   1/1998

(Continued)

OTHER PUBLICATIONS

"Feature representation and compression for content-based retrieval," H. Xie and A. Ortega, Proc. vol. SPIE 4310, pp. 111-122 (2000).*

(Continued)

*Primary Examiner*—Daniel G Mariam
*Assistant Examiner*—Manav Seth
(74) *Attorney, Agent, or Firm*—Norris McLaughlin & Marcus, PA; Christa Hildebrand, Esq.

(57) ABSTRACT

The invention relates to a method for the transmission of additional information when using a method for compressing data by means of a prioritizing pixel transmission, said data consisting of individual pixel groups, each of which comprises a positional value within an image array and at least one pixel value. The minimum size of the image array is defined by the height (h) and the width (b) of an image, expressed in pixels. The invention is characterized by the fact that positional values which do not occur in the actual data but lie outside the range of the image array are used during the transmission of additional information.

12 Claims, 3 Drawing Sheets

U.S. PATENT DOCUMENTS

| | | | | |
|---|---|---|---|---|
| 5,111,292 | A * | 5/1992 | Kuriacose et al. | 375/240.01 |
| 5,122,875 | A * | 6/1992 | Raychaudhuri et al. | 348/390.1 |
| 5,144,425 | A * | 9/1992 | Joseph | 375/240.05 |
| 5,533,140 | A * | 7/1996 | Sirat et al. | 382/108 |
| 5,579,183 | A * | 11/1996 | Van Gestel et al. | 360/48 |
| 5,647,024 | A * | 7/1997 | Kawauchi et al. | 382/232 |
| 5,719,631 | A | 2/1998 | Pandel | |
| 5,757,382 | A * | 5/1998 | Lee | 345/441 |
| 5,787,199 | A * | 7/1998 | Lee | 382/203 |
| 5,835,730 | A * | 11/1998 | Grossman et al. | 709/247 |
| 6,008,847 | A | 12/1999 | Bauchspies | |
| 6,097,842 | A * | 8/2000 | Suzuki et al. | 382/232 |
| 6,157,743 | A * | 12/2000 | Goris et al. | 382/233 |
| 6,339,658 | B1 * | 1/2002 | Moccagatta et al. | 382/240 |
| 6,459,815 | B1 * | 10/2002 | Saw | 382/246 |
| 6,493,692 | B1 * | 12/2002 | Kobayashi et al. | 706/46 |
| 6,516,094 | B1 * | 2/2003 | Takahashi et al. | 382/243 |
| 6,647,143 | B1 * | 11/2003 | Nakashima | 382/166 |
| 6,731,792 | B1 * | 5/2004 | Tanaka | 382/164 |
| 6,859,155 | B2 * | 2/2005 | Kondo et al. | 341/106 |
| 6,897,977 | B1 * | 5/2005 | Bright | 358/1.18 |
| 6,901,169 | B2 * | 5/2005 | Bottou et al. | 382/224 |
| 6,961,754 | B2 * | 11/2005 | Christopoulos et al. | 709/204 |
| 6,963,570 | B1 * | 11/2005 | Agarwal | 370/395.32 |
| 7,355,608 | B1 * | 4/2008 | Beach | 345/629 |
| 7,359,560 | B2 * | 4/2008 | Mossakowski | 382/240 |
| 7,369,154 | B2 * | 5/2008 | Mossakowski | 348/14.12 |
| 2002/0053049 | A1 * | 5/2002 | Shiomoto et al. | 714/701 |
| 2003/0014264 | A1 * | 1/2003 | Fujii et al. | 704/500 |
| 2008/0071877 | A1 * | 3/2008 | Beach | 709/207 |

FOREIGN PATENT DOCUMENTS

| | | |
|---|---|---|
| DE | 693 24 538 T2 | 5/1999 |
| DE | 694 25 047 T2 | 8/2000 |
| DE | 695 19 462 T2 | 6/2001 |
| DE | 10152 612 A1 | 10/2002 |
| DE | 10113880 | 10/2002 |
| DE | 696 10 987 T2 | 12/2002 |
| EP | 1 120 968 A | 8/2001 |
| EP | 1331820 | 1/2003 |
| WO | WO 9819273 | 5/1998 |
| WO | WO 0235884 A | 5/2002 |
| WO | WO 02078352 | 10/2002 |

OTHER PUBLICATIONS

Simon S: "Generalized Run-Length Coding for SNR-Scalable Image Compression" Signal Processing: Theories and Applications, Proceeding of Eusipco. Sep. 13, 1994 pp. 560-563 XP008007229 p. 560, col. 2, line 10-line 21 paragraph '03.01.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

Fig. 5

METHOD FOR THE TRANSMISSION OF ADDITIONAL INFORMATION WHEN USING A METHOD FOR COMPRESSING DATA BY MEANS OF PRIORITIZING PIXEL TRANSMISSION

BACKGROUND OF THE INVENTION

1. Field of the Invention

The invention is directed to a method for transmitting additional information when using a method for compressing data with a prioritizing pixel transmission, wherein the data comprise individual pixel groups, with each pixel group having a position value within an image array and at least one pixel value and wherein the minimal size of the image array is defined by the height h and the width b of an image, expressed in pixels.

Most information is currently already provided in electronic form. A large number of data formats exist that are optimized and/or specified by a manufacturer for different applications. These data formats are standardized, for example, as so-called MIME types, document formats and graphic formats. Documents can be assembled from documents having different data formats, for example on a website. However, if the individual documents overlap, e.g., if a transparent text is overlaid on a picture, or if a moving display is used, then it may be difficult to find an optimal combination that achieves the highest compression rates, because, for example, the various documents are independent of each other.

2. Description of the Related Art

A basis of the present invention are methods for compressing and decompressing image or video data through prioritized pixel transmission, are disclosed, for example, in U.S. Pat. No. 7,130,347 and U.S. published application 2004/0109609. These methods process, for example, digital image data or video data consisting of an array of individual pixels, with each pixel having a time-dependent pixel value that describes color and luminance information of the pixel. According to the invention disclosed in these documents, a priority is associated with each pixel and/or with each pixel group, and the pixels are written to a priority array according to their prioritization. At each point in time, the array includes the pixel values sorted according to their prioritization. These pixels and the pixel value used for computing the prioritization are transmitted and/or stored according to the prioritization. A pixel is given a high priority, if the difference with respect to its adjacent pixels is very large. The actual pixel values are reconstructed on a display. The pixels that have not ever been transmitted are computed from the already transmitted pixel.

The entire contents of the applications U.S. Pat. No. 7,130,347 and U.S. published application 2004/0109609 are included in the present application by reference.

The methods described in U.S. Pat. No. 7,130,347 and U.S. published application 2004/0109609 for prioritizing pixel transmission have a number of advantages, for example a high compression ratio, scalability, error tolerance, etc. In the certain cases, it may be more advantageous to employ a combination of different compression methods. However, it may be a problem to optimally combine these different methods, while maintaining the basis for the compression, namely the prioritizing pixel transmission.

It is an object of the present invention to provide a method for transmitting additional information with the prioritizing pixel transmission that enables an effective compression of documents having a plurality of different document types.

BRIEF SUMMARY OF THE INVENTION

According to the invention, the object is solved by using in the transmission of the additional information position values that do not occur in the actual data, but are located instead outside the range of the image array.

According to the invention, position values are used when transmitting the additional information that are not included in the actual data, but are located outside the range of the image array.

In an advantageous embodiment of the invention, the additional information is transmitted in the form of textures, which are preferably provided and transmitted in compressed form. The additional information can be provided in any possible compressed format.

With the invention, a significantly higher compression factor is advantageously possible by employing additional information in the form of textures which are transmitted outside the actual image information, but within the same data stream. Transmission of the texture within the data stream obviates the need for opening an additional transmission channel. Conversely, for example, when transmitting Web pages with present technology, a new connection is established for each image. The disclosed in-line data transmission automatically synchronizes the transmission in real-time applications. Transmission of textures also facilitates further processing. Because text within the texture can be transmitted, for example, in ASCII format, there is no longer a need for optical character recognition (OCR) on the receiver side.

Additional embodiments and modifications of the invention are recited in the dependent claims.

BRIEF DESCRIPTION OF THE DRAWINGS

Figures 3, 4:
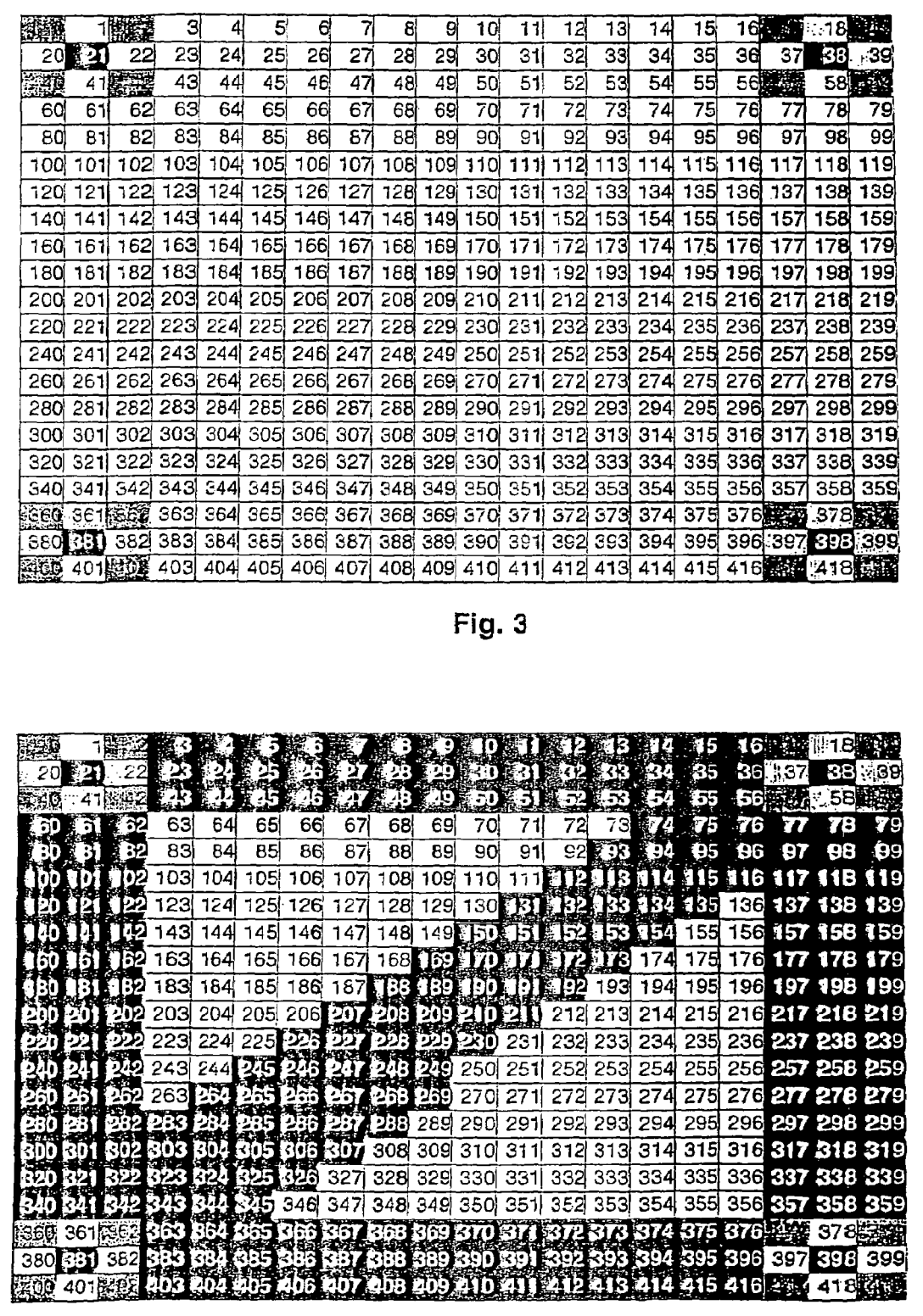

FIG. 3 shows a newly generated image array with inserted pixel groups in the corner of the image;

FIG. 4 filling in all the areas between the already inserted pixel groups;

FIG. 5 shows insertion of additional pixel groups and filling in the intermediate areas.

DETAILED DESCRIPTION OF THE INVENTION

Figures 1, 2:
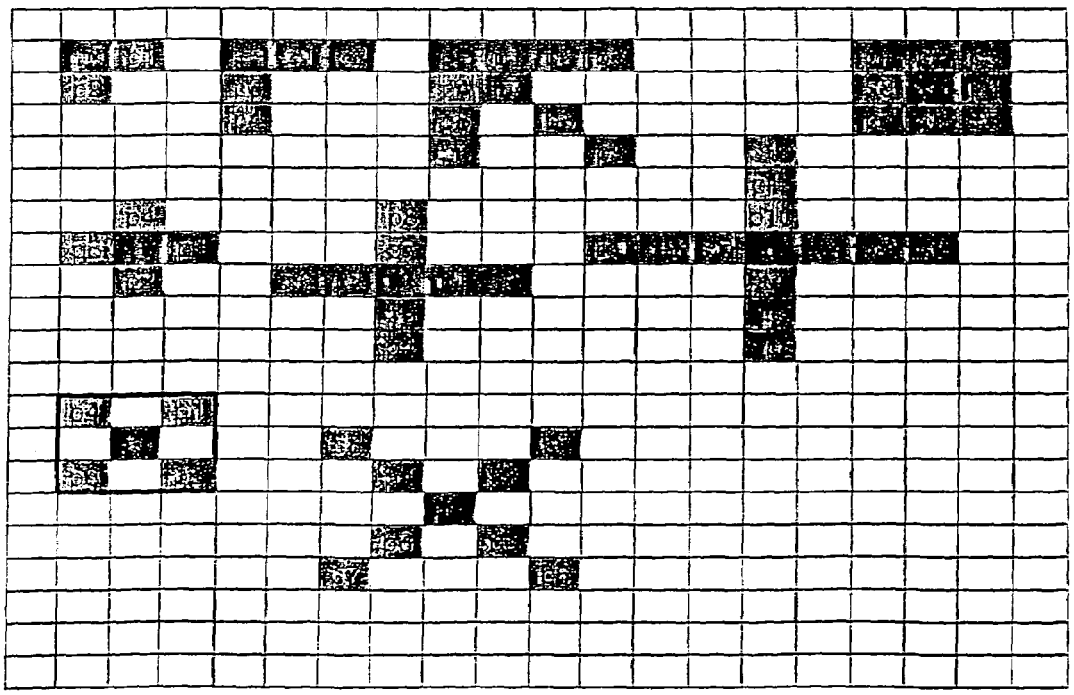
FIG. 1 shows a diagram of an image array consisting of 20×21 pixels.
FIG. 2 shows a diagram with different forms of pixel groups.

An embodiment of the invention will be described below.

The method of prioritizing pixel transmission can advantageously be combined with other (compression) methods when the other methods have one of the following features.

- large area patterns, for example, in form of scalable vector graphics (SVG)
- frequently occurring sprites (bitmap pattern)
- predominantly consisting of text, so that an ASCII transmission would be advantageous (e.g., newspaper, fax)

The image or video is initially processed at the source in a conventional manner and a prioritizing list of the pixel groups is generated. In parallel, the additional information (e.g., text, pattern) is provided in the original format, optionally compressed.

In the prioritizing transmission, in general, the array position is initially transmitted followed by the values of the respective pixel group. The maximum value of the array position is derived from the height h×width b of the array. Position values located outside the array can be used to transmit additional information. Because there is potentially a large amount of additional information, the type of the additional information has to be described. Existing document formats, for example MIME types, should be used to ensure the largest possible flexibility and compatibility.

The textures are transmitted in the same data stream as the actual image/video data. However, the position value is hereby located outside the normal range of the array.

An allowed position value is, for example: maximal height h×maximum width b+k, wherein k is a predefined value that is known to the transmitter and receiver and that indicates that a texture is included.

When this position value is transmitted, the application in the receiver recognizes that a texture is included.

Instead of transmitting immediately thereafter the values of the pixel groups, a header is initially transmitted that includes the properties of the texture and possibly additional information. The header can include, for example, the following fields:

Document format of the texture
Position of the texture in the image/video array
Size of the texture in the array
Number of bytes required for transmission
Part of the total texture, if the total texture must be subdivided into several parts due to its size
Additional fields for additional use The actual texture data are transmitted following the header.

The array with the transmitted textures is then reassembled and displayed on the receiver side.

The invention claimed is:

1. Method for transmitting additional information when using a method for compressing data by way of a prioritizing pixel transmission, wherein the compressed data comprise individual pixel groups, with each pixel group having a position value within an image array and at least one pixel value, comprising the steps of:
defining a minimal size of the image array by a height h and a width b of an image, expressed in pixels;
transforming the data by compression;
transmitting the compressed data and the additional information, wherein the additional information is placed at position values that do not occur in the data, and is located instead outside an area of the image array;
reassembling the compressed data with the additional information; and
displaying the reassembled data;
wherein the additional information is transmitted in the form of textures and the additional information has a position value of height h×width b of the image array +k, wherein k is a predefined value that indicates that a texture is included.

2. Method according to claim 1, wherein the additional information is provided and transmitted in compressed form.

3. Method for transmitting additional information when using a method for compressing data by way of a prioritizing pixel transmission, wherein the compressed data comprise individual pixel groups, with each pixel group having a position value within an image array and at least one pixel value, comprising the steps of:
defining a minimal size of the image array by a height h and a width b of an image, expressed in pixels;
transforming the data by compression;
transmitting the compressed data and the additional information, wherein the additional information is placed at position values that do not occur in the data, and is located instead outside an area of the image array;
reassembling the compressed data with the additional information; and
displaying the reassembled data;
wherein the additional information is identified as being associated with a certain document format.

4. Method according to claim 1, wherein the additional information comprises a header that includes the properties of the texture and optionally one or more of fields of document format of the texture, position of the texture in the image/video array, size of the texture in the array, number of bytes required for transmission, part of the total texture, if the total texture must be subdivided into several parts due to its size and additional fields for additional use.

5. Method for transmitting additional information when using a method for compressing data by way of a prioritizing pixel transmission, wherein the compressed data comprise individual pixel groups, with each pixel group having a position value within an image array and at least one pixel value, comprising the steps of:
defining a minimal size of the image array by a height h and a width b of an image, expressed in pixels,
transforming the data by compression;
transmitting the compressed data and the additional information, wherein the additional information is placed at position values that do not occur in the data, and is located instead outside an area of the image array;
reassembling the compressed data with the additional information; and
displaying the reassembled data;
wherein priorities are assigned to the additional information depending on its content-related relevance, its temporal relevance or its device-dependent relevance.

6. Method for transmitting additional information when using a method for compressing data by way of a prioritizing pixel transmission, wherein the compressed data comprise individual pixel groups, with each pixel group having a position value within an image array and at least one pixel value, comprising the steps of:
defining a minimal size of the image array by a height h and a width b of an image, expressed in pixels,
transforming the data by compression;
transmitting the compressed data and the additional information, wherein the additional information is placed at position values that do not occur in the data, and is located instead outside an area of the image array;
reassembling the compressed data with the additional information; and
displaying the reassembled data;
wherein the additional information is transmitted in descending order of its priority.

7. Method according to claim 1, wherein the additional information is recognized in the receiver based on its specific position values.

8. A method for transmitting image data and additional information by prioritized transmission of compressed image data, comprising the steps of:
defining a minimal size of an image array by a height h and a width b, expressed in pixels,
arranging the image data in pixel groups, with each pixel group having a commonly assigned prioritization level and a position value within the image array and at least one pixel value,
arranging the additional information at position values outside the range of the image array,
compressing a data stream including both the image data of the pixel groups at the position value within the image array and the additional information at the position values outside the range of the image array, and transmitting the compressed data stream by prioritized transmission from a transmitter to a receiver;

reassembling the compressed data with the additional information; and displaying the reassembled data.

9. The method of claim 8, wherein a predefined number of the position values for the additional information are located outside the minimally sized image array.

10. The method of claim 9, wherein a position value indicating the predefined number located outside the minimally sized image array is transmitted from the transmitter to the receiver.

11. The method of claim 9, wherein transmission of the position value indicates to the receiver that a texture is included.

12. The method of claim 9, wherein transmission of the position value indicates to the receiver that additional information is included.

* * * * *